United States Patent
Narayanan et al.

(10) Patent No.: US 8,706,471 B2
(45) Date of Patent: Apr. 22, 2014

(54) COMMUNICATION SYSTEM USING MIXED TRANSLATING WHILE IN MULTILINGUAL COMMUNICATION

(75) Inventors: Shrikanth Narayanan, Santa Monica, CA (US); Panayiotis Georgiou, La Crescenta, CA (US)

(73) Assignee: University of Southern California, Los Angeles, CA (US)

( * ) Notice: Subject to any disclaimer, the term of this patent is extended or adjusted under 35 U.S.C. 154(b) by 1485 days.

(21) Appl. No.: 11/750,926

(22) Filed: May 18, 2007

(65) Prior Publication Data
US 2008/0071518 A1  Mar. 20, 2008

Related U.S. Application Data

(60) Provisional application No. 60/801,254, filed on May 18, 2006.

(51) Int. Cl.
*G06F 17/28* (2006.01)
*G10L 21/00* (2013.01)
*G10L 15/22* (2006.01)

(52) U.S. Cl.
CPC ............ G06F 17/289 (2013.01); G10L 15/22 (2013.01)
USPC ................................... 704/2; 704/270; 704/5

(58) Field of Classification Search
USPC ............................................. 704/2; 364/419
See application file for complete search history.

(56) References Cited

U.S. PATENT DOCUMENTS

| | | | |
|---|---|---|---|
| 2,177,790 A | 10/1939 | Scott | |
| 2,674,923 A | 4/1954 | William | |
| 4,067,122 A | 1/1978 | Fernandez et al. | |
| 4,419,080 A | 12/1983 | Erwin | |
| 4,599,612 A | 7/1986 | Kaji et al. | |
| 4,604,698 A | 8/1986 | Ikemoto et al. | |
| 4,658,374 A | 4/1987 | Tanimoto et al. | |
| 5,161,105 A * | 11/1992 | Kugimiya et al. | 704/4 |
| 5,201,042 A | 4/1993 | Weisner et al. | |
| 5,525,060 A | 6/1996 | Loebner | |
| 5,576,953 A | 11/1996 | Hugentobler | |
| 5,678,001 A | 10/1997 | Nagel et al. | |
| 5,697,789 A | 12/1997 | Sameth et al. | |
| 5,741,136 A | 4/1998 | Kirksey et al. | |
| 5,760,788 A | 6/1998 | Chainini et al. | |
| 5,799,267 A | 8/1998 | Siegel | |
| 5,855,000 A | 12/1998 | Waibel et al. | |
| 5,882,202 A | 3/1999 | Sameth et al. | |
| 5,926,179 A | 7/1999 | Matsuda et al. | |

(Continued)

OTHER PUBLICATIONS

U.S. Appl. No. 11/754,148, filed May 25, 2007, in Office Action mailed Jun. 7, 2010, 16 pages.

(Continued)

*Primary Examiner* — Farzad Kazeminezhad
(74) *Attorney, Agent, or Firm* — Fish & Richardson P.C.

(57) ABSTRACT

A translation between a source language and a target language is disclosed. The source language items are divided, with primary and secondary source language items or named entities being identified, where the primary and secondary source languages being different from each other and from the target language. The entities in the second source language are translated in a different way. For example, they may be copied into the target language, or translated in a special way that is based on their meaning, e.g, into a term that has a more descriptive meaning in the target language.

10 Claims, 1 Drawing Sheet

(56) References Cited

U.S. PATENT DOCUMENTS

| | | | |
|---|---|---|---|
| 5,991,594 A | 11/1999 | Froeber et al. | |
| 5,991,711 A | 11/1999 | Seno et al. | |
| 6,073,146 A * | 6/2000 | Chen | 715/264 |
| 6,234,802 B1 | 5/2001 | Pella et al. | |
| 6,243,675 B1 | 6/2001 | Ito | |
| 6,339,754 B1 | 1/2002 | Flanagan et al. | |
| 6,374,224 B1 | 4/2002 | Horiguchi et al. | |
| 6,394,899 B1 | 5/2002 | Walker | |
| 6,669,562 B1 | 12/2003 | Shiino | |
| 6,755,657 B1 | 6/2004 | Wasowicz | |
| 6,859,778 B1 | 2/2005 | Bakis et al. | |
| 6,866,510 B2 | 3/2005 | Polanyi et al. | |
| 6,970,821 B1 | 11/2005 | Shambaugh et al. | |
| 7,016,829 B2 | 3/2006 | Brill et al. | |
| 7,155,382 B2 | 12/2006 | Boys | |
| 7,238,024 B2 | 7/2007 | Rehbein et al. | |
| 7,359,849 B2 * | 4/2008 | Palmquist | 704/5 |
| 7,409,348 B2 | 8/2008 | Wen et al. | |
| 7,461,001 B2 | 12/2008 | Liqin et al. | |
| 7,689,407 B2 | 3/2010 | Yang et al. | |
| 7,689,422 B2 | 3/2010 | Eves et al. | |
| 2002/0059056 A1 | 5/2002 | Appleby | |
| 2002/0095281 A1 | 7/2002 | Cox et al. | |
| 2002/0150869 A1 | 10/2002 | Shpiro | |
| 2004/0083111 A1 | 4/2004 | Rehbein et al. | |
| 2004/0210923 A1 | 10/2004 | Hudgeons et al. | |
| 2004/0248068 A1 | 12/2004 | Davidovich | |
| 2005/0014563 A1 | 1/2005 | Barri | |
| 2005/0084829 A1 | 4/2005 | Peters | |
| 2005/0165645 A1 | 7/2005 | Kirwin | |
| 2005/0216256 A1 | 9/2005 | Lueck | |
| 2006/0212288 A1 | 9/2006 | Sethy et al. | |
| 2006/0293874 A1 | 12/2006 | Zhang et al. | |
| 2007/0015121 A1 | 1/2007 | Johnson et al. | |
| 2007/0136068 A1 * | 6/2007 | Horvitz | 704/270 |
| 2007/0208569 A1 | 9/2007 | Subramanian et al. | |
| 2007/0294077 A1 | 12/2007 | Narayanan et al. | |
| 2008/0003551 A1 | 1/2008 | Narayanan et al. | |
| 2008/0040095 A1 * | 2/2008 | Sinha et al. | 704/2 |
| 2008/0065368 A1 | 3/2008 | Narayanan et al. | |
| 2008/0255824 A1 | 10/2008 | Aso | |
| 2008/0268955 A1 | 10/2008 | Spittle | |
| 2009/0106016 A1 | 4/2009 | Athsani et al. | |
| 2010/0009321 A1 | 1/2010 | Purushotma | |

OTHER PUBLICATIONS

U.S. Patent Office, U.S. Appl. No. 11/752,227, filed May 22, 2007, in Office Action mailed Apr. 30, 2010, 11 pages.

U.S. Patent Office, U.S. Appl. No. 11/749,677, filed May 16, 2007, in Office Action mailed Aug. 31, 2010, 20 pages.

* cited by examiner

COMMUNICATION SYSTEM USING MIXED TRANSLATING WHILE IN MULTILINGUAL COMMUNICATION

CROSS-REFERENCE TO RELATED APPLICATIONS

This application claims priority to U.S. Provisional Application 60/801,254, filed May 18, 2006. The disclosure of the prior application is considered part of (and is incorporated by reference in) the disclosure of this application.

FEDERALLY SPONSORED RESEARCH OR DEVELOPMENT

This invention was made with government support under Grant No. N66001-02-C-6023 awarded by DARPA/SPAWAR. The government has certain rights in the invention.

BACKGROUND

Speech recognition and speech translation systems receive spoken information in one language, and translate it to another language. These systems are often based on a database that has been trained using the two different languages.

SUMMARY

The present application teaches techniques for handling mixed multilingual communication in a speech recognition and translation system.

According to an embodiment, entities from outside the source language are isolated and preserved during machine translation of speech.

BRIEF DESCRIPTION OF THE DRAWINGS

These and other aspects will now be discussed in reference to the accompanying drawings, wherein.

DETAILED DESCRIPTION

The general structure and techniques, and more specific embodiments, which can be used to effect different ways of carrying out the more general goals, are described herein.

The present application relates to issues arising in speech recognition and speech translation systems. These systems can use text-to-text translation system, or can be systems that listen to oral communication, e.g. speech translation systems. These systems are referred to herein as being speech systems. It should be understood that speech systems include generically all of these systems.

The inventors recognized a problem that occurs in these systems. Specifically, it is not uncommon to hear multiple different languages uttered together. For example, it is not uncommon to hear an English utterance in a foreign language. The English utterances may be English names, English words, or others. Bilingual speakers may even pronounce the foreign words with the appropriate accent for the multiple languages.

Speech systems have historically assumed that the input speech is in a specified language, and compare it against corpora formed from training information. The attempt to translate may be complicated or fooled by the foreign language words.

An embodiment described herein uses language detection for increased speech recognition and speech translation. An embodiment describes processing and/or preservation of foreign language material within information to be translated.

First, a notation is described. Consider the example of a translation from an English speaker into Arabic. In the example, the English speaker is bilingual, also fluent in Spanish, and may use Spanish words within the utterance. The languages are represented notationally as follows. The primary source language or PL is English in this example, and transcription of text(P) refers to this primary source language. The secondary source language here is Spanish, referred to as SL; transcription of text(S). The target language or TL here is Arabic, and transcription of text(T).

Figure 1:
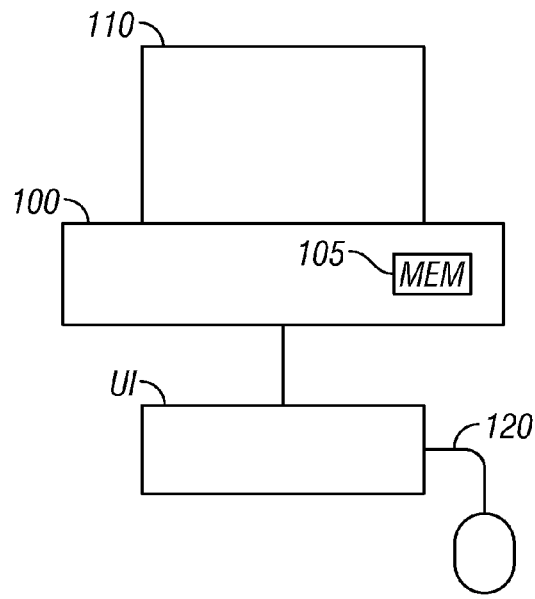
FIG. 1 illustrates an embodiment where a computer runs a program that is stored on the storage media.

The operation can be carried out by a programmed computer that runs the flowcharts described herein. The computer can be as shown in FIG. 1. FIG. 1 illustrates an embodiment where a computer 100 runs a program that is stored on the storage media 105. The program produces output through a human-computer interface 110 such as a display, sound (loudspeakers, headphones etc) or any other means. The user can interact with the program and display via a user interface which may include a keyboard, microphone, mouse, and any other user interface part materials.

Figure 2:
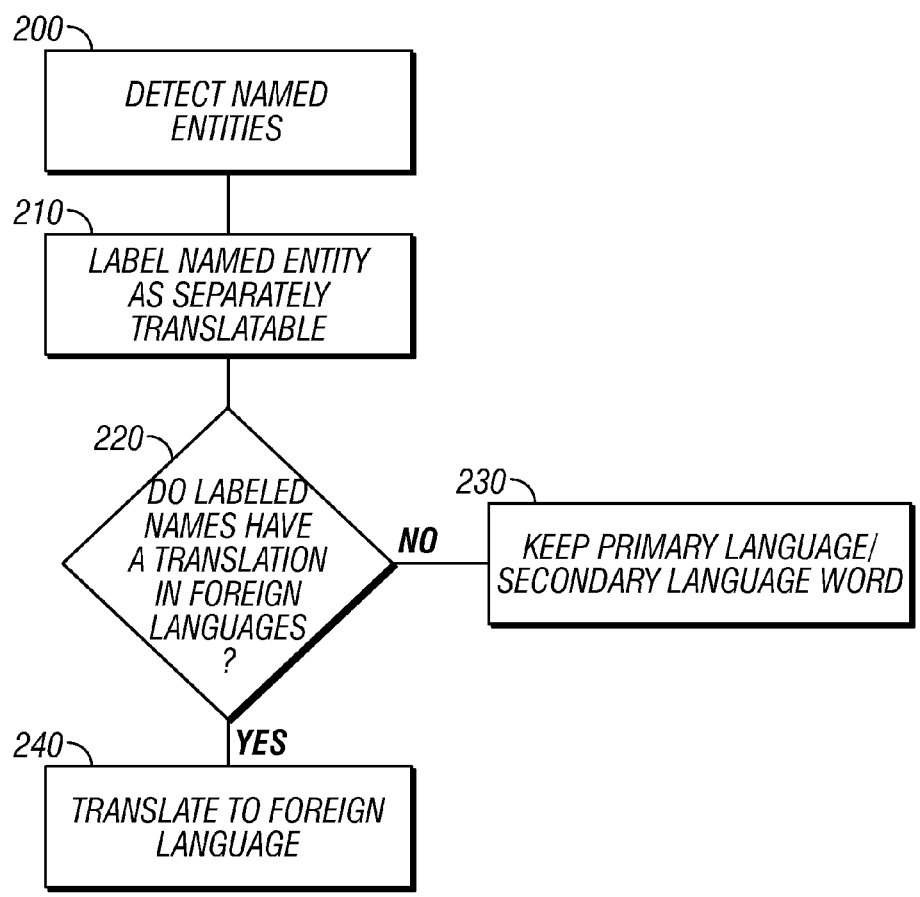
FIG. 2 illustrates a flowchart of some preprocessing parts that are carried out.

In operation, the computer is programmed to carry out a speech operation. FIG. 2 illustrates a flowchart which may be a preprocessing operation for the final speech operation. These preprocessing parts may be carried out as part of the segmentation of the speech, for example.

At 200, the system first detects words within the language that are "named entities". The named entities may be in either the primary language or the secondary language. This detection allows the name entities to be appropriately conveyed to the target. Embodiments as described herein use proper names as the named entities; however it should be understood that other named entities can be used.

210 illustrates labeling the named entities as being separately translatable. Certain named entities, such as proper names, may be conveyed or preserved into the translated language either by re-synthesis in the translated language or by simple repetition of the primary language or secondary language after voice morphing into the translated language. In the embodiment, the names can be proper names, can be product names, they can be items which represent places, or they can simply be words in the foreign (primary or secondary source) language representing places such as city names.

The detecting and translating can be carried out as follows.
(my name is John)P becomes
(my name is)P (John)P
Translating this to the target language (P→T) yields
(my name is)T (John)P.

In this example, the word John is actually a named entity, here a name, in the primary language, and needs to stay in the primary language as part of the translation. Accordingly, the phrase is first segmented into the two parts: "my name is" first in the primary language, and "John" also in the primary language. Upon translation, the "my name is" part is translated, but "John" is maintained. The named entity may be uttered via automated speech reading, or alternatively may be recorded in the source language and replayed in the target language.

A second example includes information in both the primary and secondary languages.

(My name is Jorge)P
(My name is)P (Jorge)S
P→T
(My name is)T (Jorge)S.

In both of these examples, the "Jorge" and "John" do not have corresponding translations in the foreign language, and hence the primary language or secondary language word is kept at 230. The remainder is translated at 240.

If the label names have a translation in the foreign language, they are translated at 240. An example is:

(Take this aspirin)P
(Take this)P (aspirin)P
P→T
(Take this) T (aspirin)T.

In this example, the word "aspirin", which can be in the primary or secondary language has a translation in the foreign language. Accordingly, this translation is used.

Many times, the named entity will also have meaning as a regular dictionary word, but identifying it as a named entity will increase its translation accuracy. For example:

(He is driving an Infinity)P
(He is driving)P (an Infinity)P.
P→T
(He is driving)T (a luxury car)T This kind of generic word for the meaning of the term in the source language may be more meaningful in the translated language. Alternatively, the original word can be retained. However, in this example, failure to identify the word "Infinity" as a named entity would likely cause it to be mistranslated, e.g., as the number infinity.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above has discussed identifying names within the phrases, it should be understood that it is alternatively possible to simply recognize any foreign word in the secondary language within the primary language during its segmentation Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop, or any other device such as a game console, a media console etc.

The programs may be written in C, or C++, or Python, or Java, or Brew, or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method comprising:
    receiving, at a computing system, speech information to be translated from a primary source language to a target language, wherein the speech information includes a phrase;
    segmenting, by the computing system, the phrase into a first part and a second part, wherein the second part includes a named entity;
    translating, by the computing system, the first part of the phrase into a first translated portion in the target language; and
    translating, by the computing system, the second part of the phrase into a second translated portion in the target language;
    wherein translating the second part comprises
        translating the second part in a first case by copying the second part into the target language when the second part is in a secondary source language different from the primary source language,
        translating the second part in a second case into the target language when the second part has a corresponding translation in the target language, and
        translating the second part in a third case into a generic word in the target language when the named entity of the second part has a first meaning that represents the named entity in the target language, the named entity has a second meaning when translated as a non-named entity into the target language, the first meaning is different than the second meaning, and the second meaning does not represent the named entity.

2. The method of claim 1, wherein the named entity in the first case is a proper name.

3. The method of claim 2, wherein the copying comprises repeating the secondary source language after voice morphing into the target language.

4. The method of claim 1, wherein the primary source language is English, the secondary source language is Spanish, and the target language is Arabic.

5. The method of claim 1, wherein the copying comprises using automated speech reading.

6. A computer-implemented system, comprising:
    an interface that receives speech information for translation into a target language, wherein the speech information comprises a first input utterance;
    and a processor programmed to:
    identify a non-named entity in a first portion of the first input utterance and a named entity in a second portion of the first input utterance
    wherein the first portion of the first input utterance is in a primary source language different than the target language, and the second portion of the first input utterance is in a secondary source language different from the primary source language and the target language; and
    translate the first portion of the first input utterance into a first portion in the target language;
    convey the second portion of the first input utterance, into a second portion in the target language;

and provide an output utterance comprising the first and second portions.

7. The system of claim 6, wherein:

the speech information comprises a second input utterance;

the processor is programmed to identify a non-named entity in a first portion of the second input utterance and a named entity in a second portion of the second input utterance, translate the first portion of the second input utterance into a first translated portion in the target language, translate the second portion of the second input utterance into one or more generic terms in a second translated portion in the target language, wherein the second translated portion has a first meaning that represents the named entity in the target language, the named entity has a second meaning when translated as a non-named entity into the target language, the first meaning is different than the second meaning, and the second meaning does not represent the named entity; and the processor is programmed to provide an output utterance comprising the first and second translated portions.

8. The system of claim 7, wherein the one or more generic terms include one or more non-named entities.

9. The system of claim 6, wherein the named entity in the second portion of the speech information includes a proper name.

10. The system of claim 6, wherein the processor is programmed to convey the second portion of the first input utterance into the second portion in the target language by repetition after voice morphing.

\* \* \* \* \*